Nov. 20, 1934.                F. R. WHITE                 1,981,441
                                AIRPLANE
                  Original Filed July 15, 1931    9 Sheets-Sheet 1
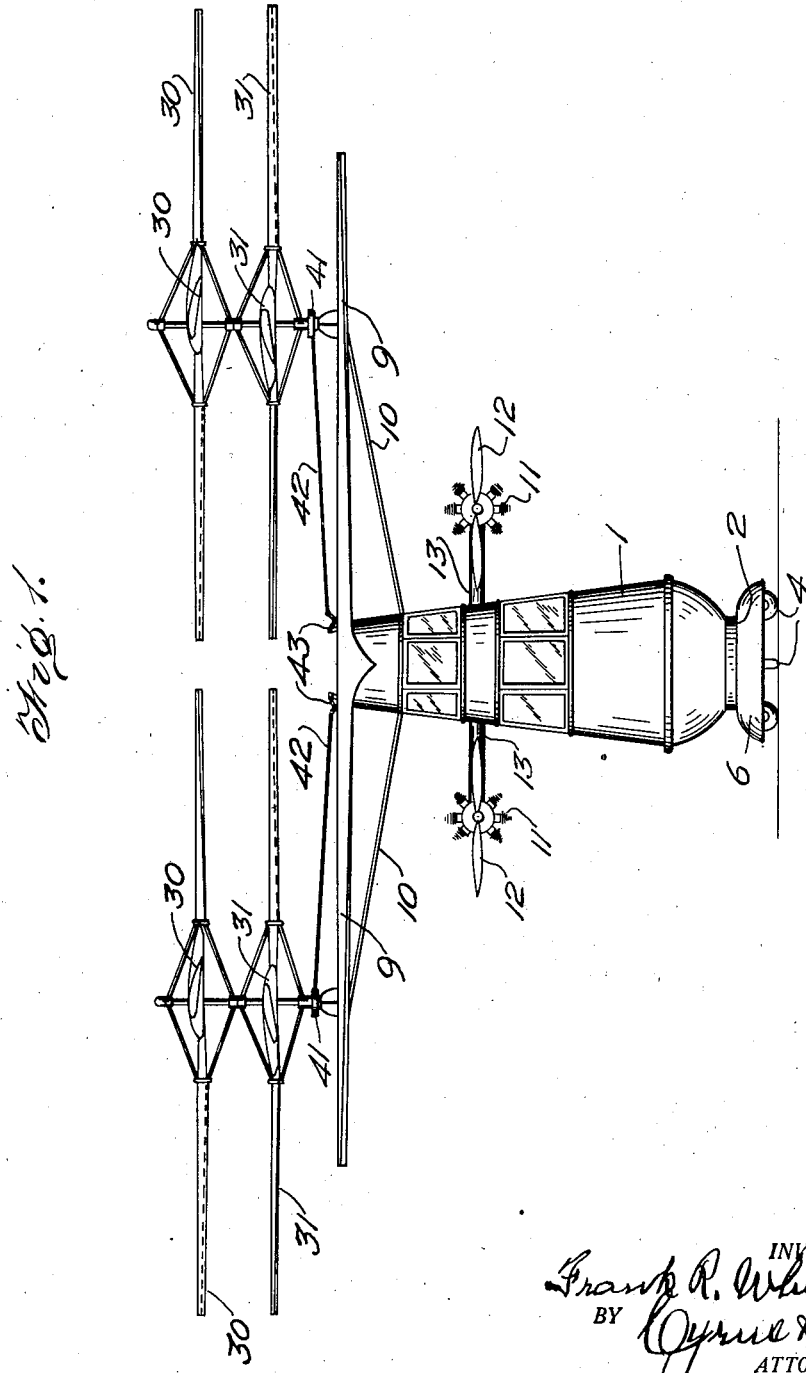

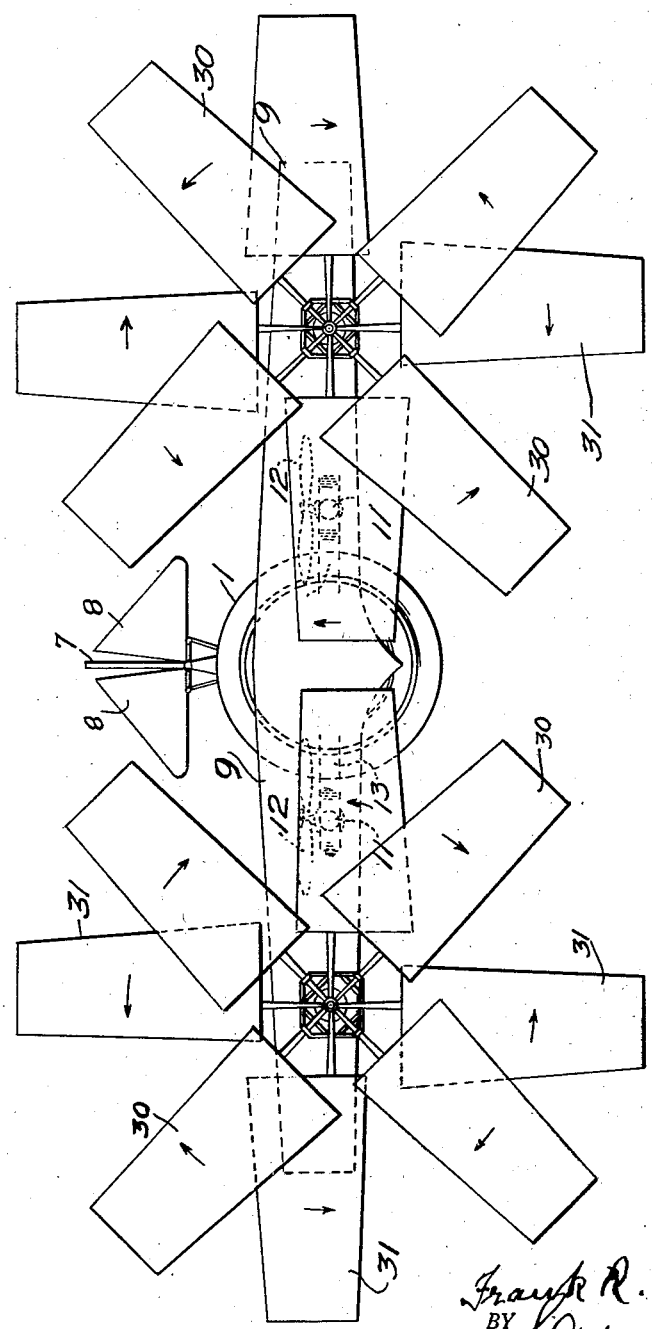

Nov. 20, 1934.　　　F. R. WHITE　　　1,981,441
AIRPLANE
Original Filed July 15, 1931　　9 Sheets-Sheet 3
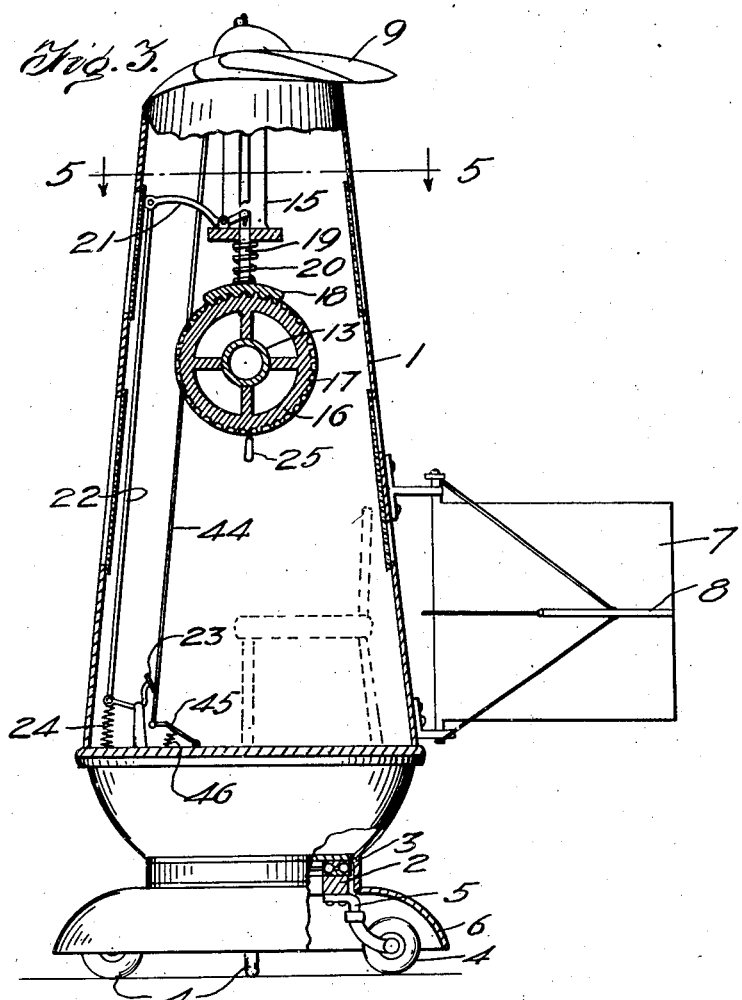
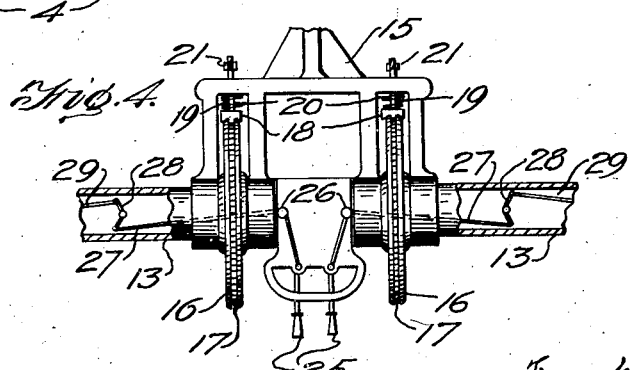
INVENTOR.
Frank R. White
BY Cyrus Kehr
ATTORNEY Nov. 20, 1934.  F. R. WHITE  1,981,441
AIRPLANE
Original Filed July 15, 1931  9 Sheets-Sheet 4
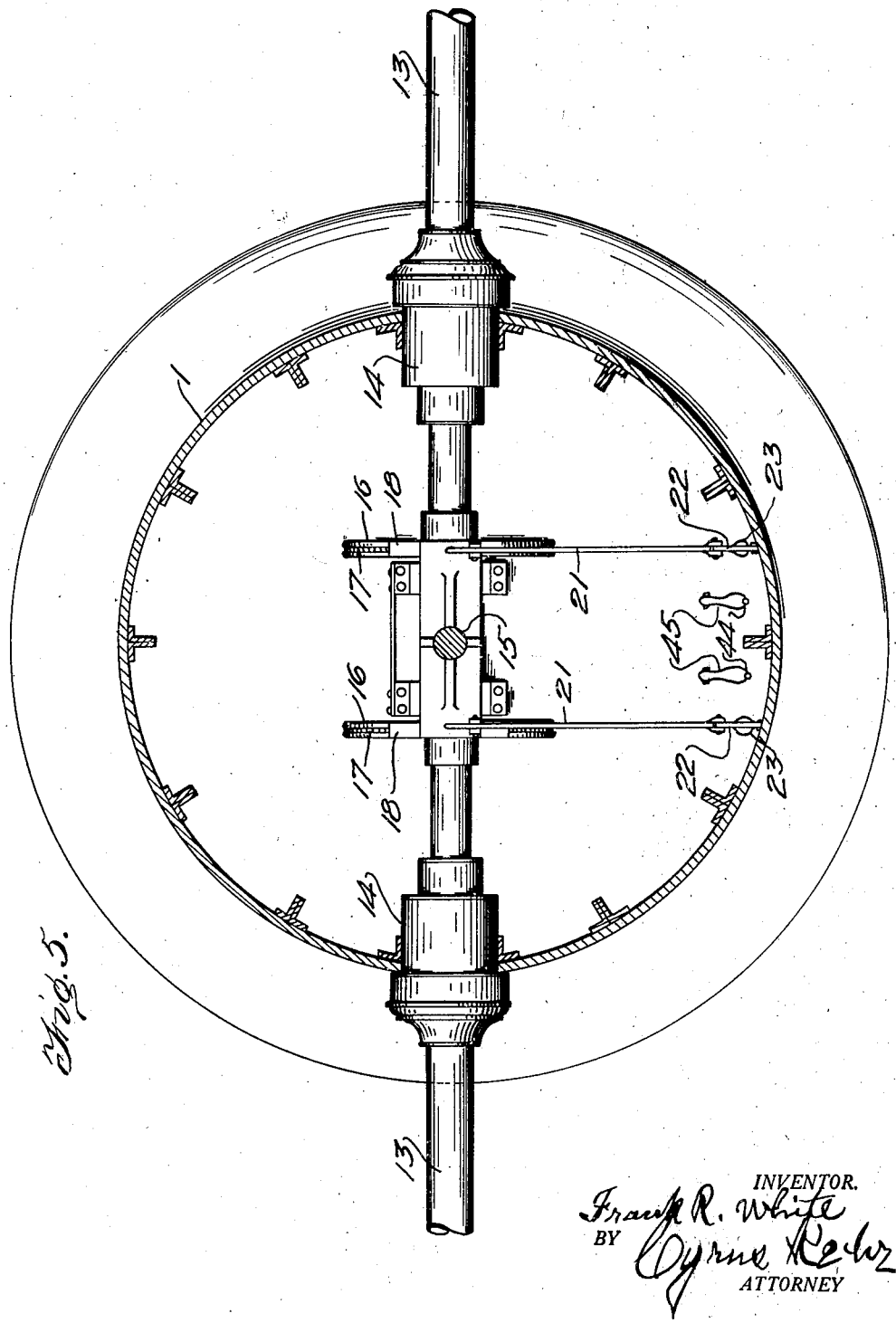

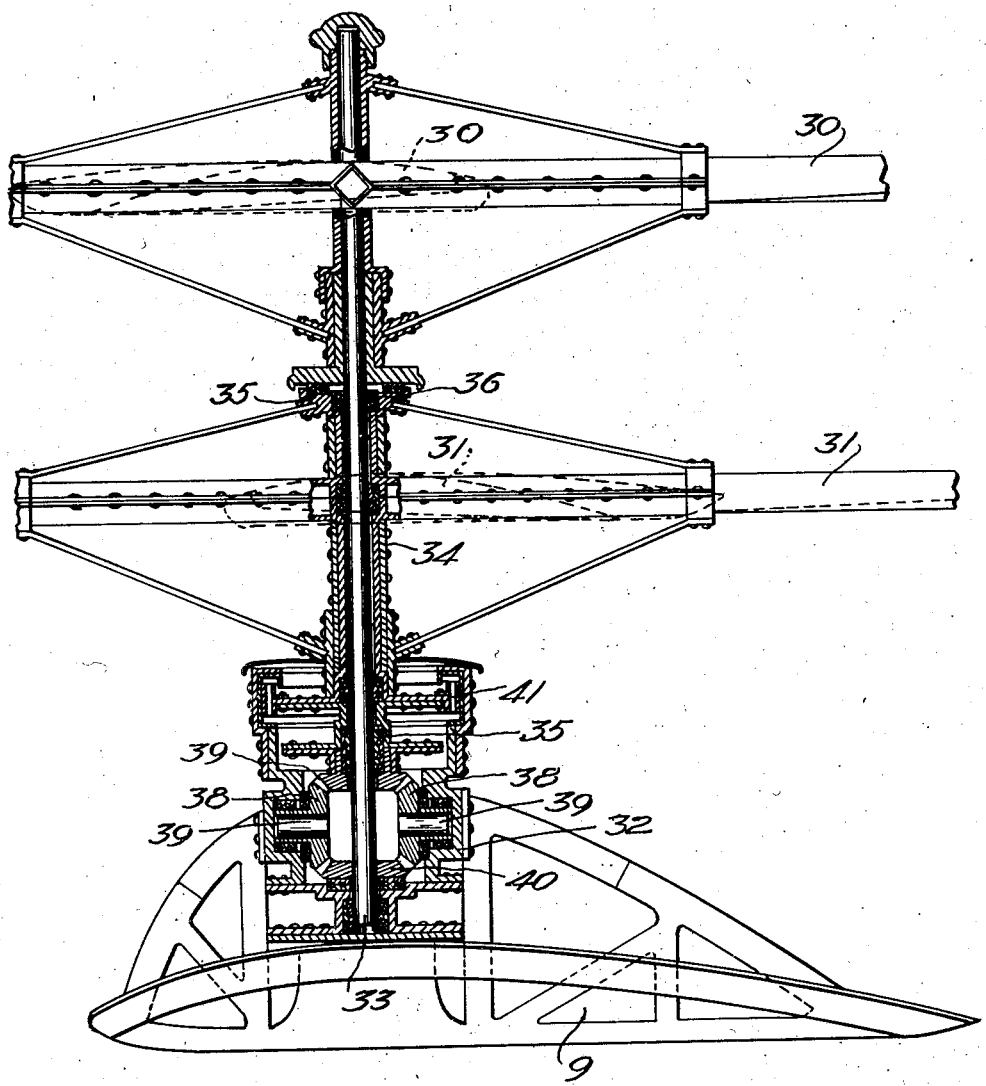

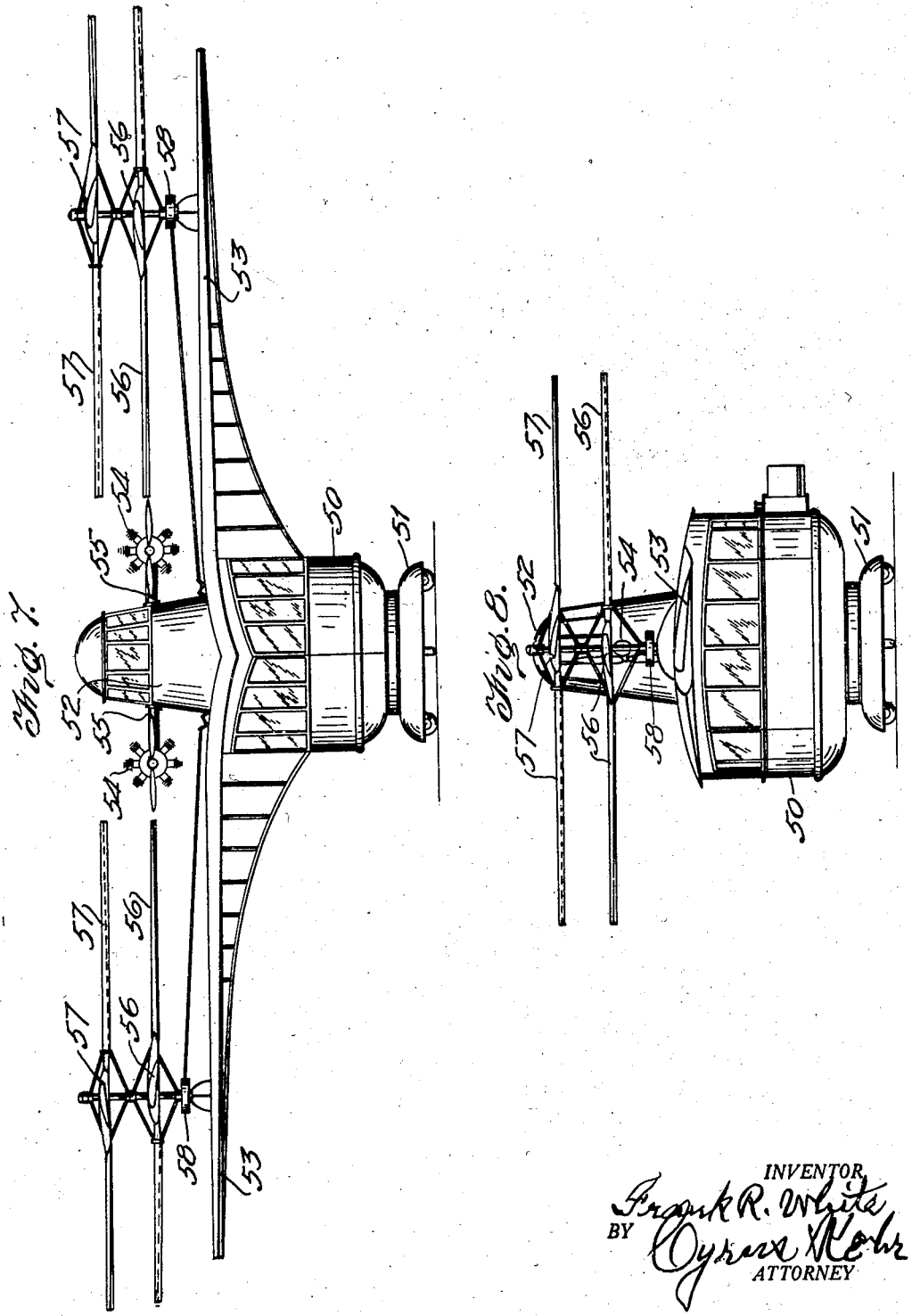

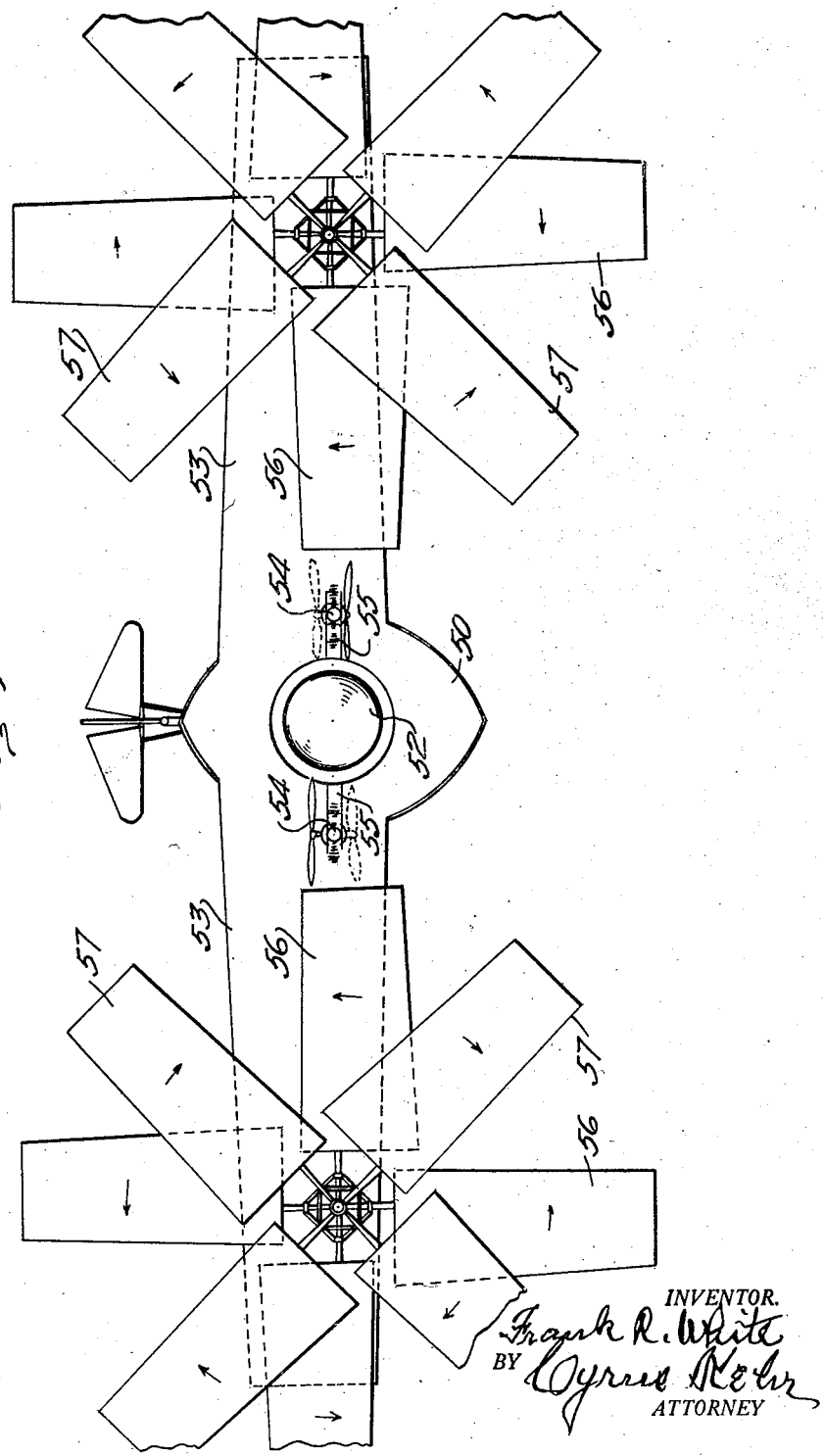

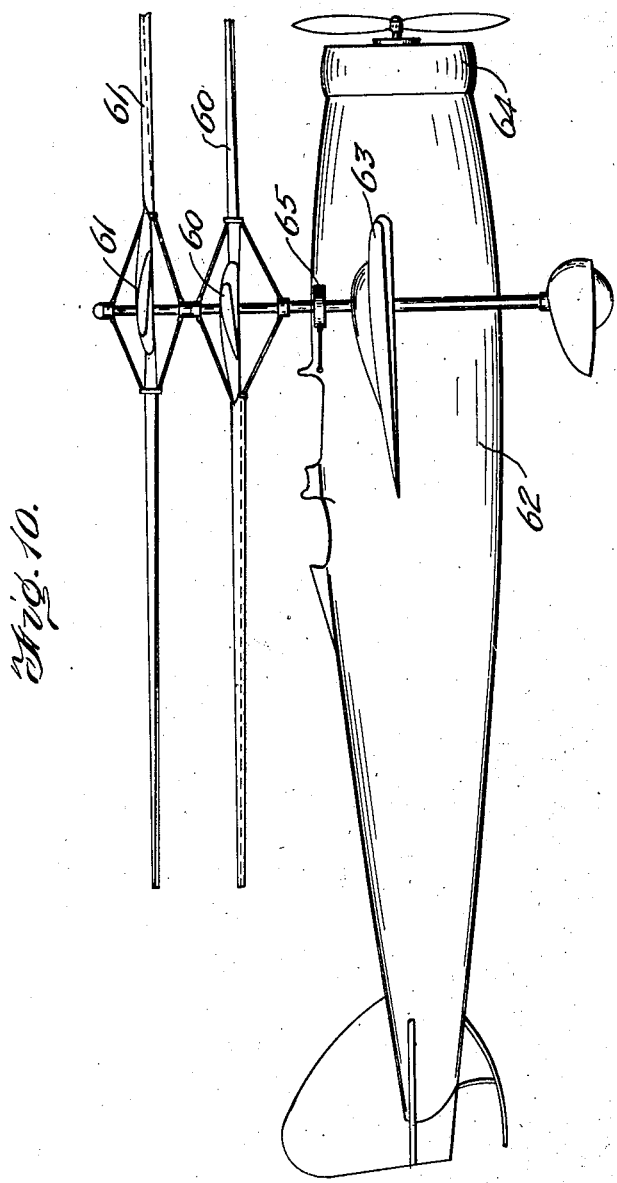

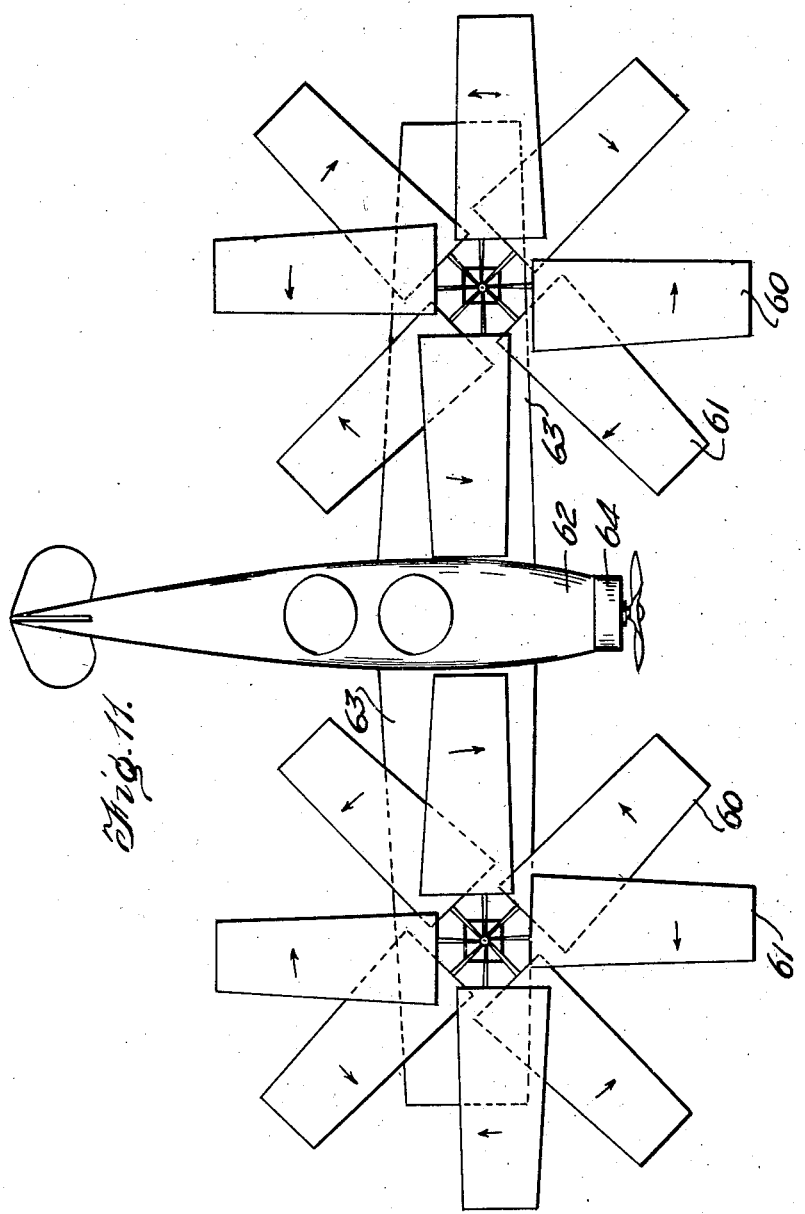

Patented Nov. 20, 1934

1,981,441

UNITED STATES PATENT OFFICE 1,981,441

AIRPLANE

Frank Russell White, Glenn Dale, Md.

Application July 15, 1931, Serial No. 551,018
Renewed April 16, 1934

5 Claims. (Cl. 244—19)

This invention relates to an improvement in airplanes, and more particularly to a vertically rising and descending ship capable of hovering over a given point at a desired altitude and able to rotate slowly or rapidly, while in such location. It is also able to leave its position in any desired lateral direction by means of shifting the position of the driving motors and their axes.

Each main wing is provided with a set of subsidiary rotary wings, which I term "boostercopters", operated in opposite directions at exactly the same speed by intermeshing gearing, said subsidiary revolving wings being provided for the purpose of accurately distributing the allotted weight which would normally come to each of the main wings to which they are attached, thereby diminishing the strain on the main wings and increasing their efficiency. The combined areas of the main wings and boostercopters is sufficient so that in the event of motor failure, the weight of the entire ship will descend gently, permitting a safe landing of the ship without mishap.

By reason of the use of the boostercopters and their efficiency in sustaining the weight of the ship, much smaller motors may be used for driving the ship than are usually required. These motors are needed for propelling the ship forward during flight and for rotating the ship bodily in taking off from the ground.

Brakes are applied for the control of the boostercopters in order to retard the rotation thereof or to permit free rotation, as desired, in order to maintain an even keel on the ship, to regulate the descent thereof, or for eliminating the necessity of banking in making a turn.

In the accompanying drawings:

Fig. 1 is a front elevation of a ship embodying my present invention;

Fig. 2 is a top plan view thereof;

Fig. 3 is a vertical sectional view through this form of ship;

Fig. 4 is a detailed side elevation, partly in section, of the control for the motors;

Fig. 5 is a horizontal sectional view on the line 5—5 of Fig. 3;

Fig. 6 is a vertical sectional view through the boostercopters;

Fig. 7 is a front elevation of any form of ship embodying the invention;

Fig. 8 is an end elevation thereof;

Fig. 9 is a top plan view thereof;

Fig. 10 is a side elevation of a monoplane showing the boostercopters applied thereto; and Fig. 11 is a top plan view thereof.

The invention may be applied to various types of ships, some of which are shown in the drawings, and in the forms shown in Figs. 1 to 9, the ships are adapted for bodily rotation in order to impart a lateral motion to the boostercopters to cause a lifting action thereon, while in the form shown in Figs. 10 and 11, the boostercopters are shown as applied to an ordinary type of airplane for increasing the lifting action thereof, permitting a take-off with a much greater load than customary, and lift the same in a much shorter distance.

In the form shown in Figs. 1 to 6, the body of the ship is designated generally by the numeral 1 and is supported upon a turntable 2 by antifriction bearings 3, the turntable being mounted upon rollers 4, which are journaled on vertical spindles 5. A hood 6 is carried by the body 1 and extends over the rollers 4, as shown in Figs. 1 and 3.

The body 1 is generally of pear shape and may be provided with a rudder 7 and stabilizers 8, as shown, controlled in any suitable way. At its upper end, the body 1 has main stationary or rigid wings 9 extending laterally in opposite directions therefrom, and braced as at 10.

The ship is designed to be driven by the usual motors 11, which drive propellers 12. The motors 11 are carried on the outer ends of tubes 13, which extend through bearings 14 in the sides of the body 1, and the inner ends of these tubes 13 are journaled in a frame 15 suspended from the top of the body 1.

Hand-wheels 16 are fixed to the tubes 13 for turning the same, and which hand-wheels 16 have teeth 17 within the peripheries thereof to receive toothed segments 18 for locking the hand-wheels 16 in set positions. Each of the segments 18 is carried at the lower end of a rod 19 and has a spring 20 bearing thereon, normally tending to force the segment into contact with the teeth 17.

The lever 21 is pivotally connected to the upper end of each of the rods 19, and is pivotally supported on a portion of the frame 15. A link 22 connects the outer end of the lever 21 with an end of a foot-pedal 23, with which a spring 24 is connected, normally tending to force the same into its normal position.

Hand throttle levers 25 are pivotally mounted in the frame 15 and are connected by ball and socket joints 26 located on the axis of the tubes 13 with links 27. The outer ends of these links 27 are connected with bell-crank levers 28 located within the tubes 13, and from which bell-crank levers links 29 extend through the tubes 13 for controlling the motors.

As shown in Figs. 1, 2 and 6, boostercopter wings 30 and 31 are mounted on the outer ends of the main wings 9, there being two sets of boostercopter wings on each of the main wings and arranged to operate in opposite directions.

These boostercopter wings 30 and 31 are designed for rotation in opposite directions from each other, as shown in Fig. 6, which represents a section therethrough, and shows the means of supporting the boostercopter wings and allowing rotation thereof in opposite directions. Each of the main wings 9 has a supporting structure 32, on which a shaft 33 is mounted, and extends within a sectional shaft 34, the sections of which are provided with anti-friction bearings 35 for keeping the sectional shaft 34 spaced from the shaft 33, in order to reduce the friction on these shafts as much as possible and to permit free rotation thereof. The shaft 33 extends through the upper end of the sectional shaft 34 and supports the boostercopter wings 30, while the shaft 34 supports the boostercopter wings 31. A thrust-bearing 36 is provided between the upper portions of the shafts 33 and 34.

The lower end of shaft 33 has a gear 37 fixed thereto, which meshes with idle gears 38 journaled on pins 39 extending radially through and carried by the frame 32. The opposite sides of the gears 38 mesh with a gear 40, which is fixed to the lower end of the sectional shaft 34.

The gears 38 mesh with the gears 37 and 40 and transmit motion between the latter two gears, causing the same to rotate in opposite directions.

Connected with the shaft 34 is a brake 41, shown as mechanically actuated by means of links 42, which extend to bell-crank levers 43, and links 44 extending downward from the bell-crank levers 43, as shown in Figs. 3 and 5, the lower ends of these links 44 being connected with foot pedals 45, normally pressed forward by springs 46. These brakes 41 are provided for the purpose of regulating the speed of descent. The application of the brakes checks the rotation of the boostercopter wings, thereby diminishing their efficiency, and increasing the speed of the descent, which speed of descent may be checked as desired by the releasing of the brakes and restoring of the free rotation of the boostercopter wings to act in their maximum capacities.

In the operation of this type of ship, the ascent is preferably by rotation, by bodily rotating the ship, which is accomplished by turning the motors 11 to opposite sides of the axis of the tubes 13, so that the operation of the propellers 12 will tend to rotate the body 1 on the turntable 2.

As this rotary motion starts, it causes the lateral motion of the axes of the boostercopters, which is increased by the turning of the ship on the turntable until such lateral speed of the boostercopters is developed sufficient to raise the ship off of the ground. This spiral or rotary ascent continues until the operator reaches the desired altitude, when he turns the motors so that both face in the same direction. This is accomplished by depressing the pedal 23 to release the segment 18 from the teeth of the hand-wheel 16, and by manually rotating the corresponding hand-wheel half a turn, which brings the reversed motor to a corresponding position with the other motor. Upon release of the pedal 23, the segment 18 again holds the hand-wheel in its fixed position and against rotation.

The operation of the motors as controlled by the throttle 25 causes forward motion of the ship through the air. When it is desired to descend, the motors 11 may be turned off or turned to an upright position and operated at a slow speed to cause the ship to gradually descend, the speed of descent being controlled by the boostercopters 30 and 31, which are regulated by the brakes 41.

In the form shown in Figs. 7, 8 and 9, the ship is similar to that shown in Figs. 1 to 5, except that it is substantially larger and adapted for the transportation of a greater number of passengers. In this form of the invention, the body of the ship is designated by the numeral 50 and is mounted on a turntable 51. A pilot house 52 is disposed over the body of the ship while the main wings 53 project laterally from opposite sides of the body 50. In this form, the driving motors 54 have their sleeves 55 projecting laterally from and journaled in the sides of the pilot house 52 for control by the pilot located therein, as before described. Boostercopter wings 56 and 57 are mounted on the main wings 53 and are designed for operation in opposite directions, as shown in Fig. 6. Brakes 58 are also provided for the boostercopters 56 and 57.

This type of ship operates in the same manner as described above in connection with the form shown in Figs. 1 to 5.

In the form shown in Figs. 10 and 11, boostercopter wings 60 and 61 are shown as applied to an ordinary type of airplane, such as a monoplane, designated generally by the numeral 62 and provided with main wings 63 and a driving motor 64. In this type of plane, the forward motion of the ship causes the ascent thereof, but the use of boostercopters 60 and 61 on the wings of the ship will materially affect the ascent and descent of the ship, causing a more rapid ascent and a vertical descent at a predetermined speed without substantial jolting of the ship.

At the same time, the use of the boostercopters permits a great increase in the fuel load carried by the ship, due to the added buoyancy and lifting power provided by the boostercopters. The brakes 65 are provided as before for regulating the speed of descent and the respective operation of the boostercopters.

I claim as my invention:

1. In an airplane, the combination of a rigid frame structure having a plurality of sets of boostercopter wings mounted thereon, each set of boostercopter wings comprising a pair of superimposed wings adapted for rotation in opposite directions, a brake for controlling the action of each set of said boostercopter wings, and means for jointly controlling the brakes of both sets of boostercopter wings from a common point.

2. In an airplane, the combination of a turntable, a passenger-receiving body rotatably mounted thereon, wings carried by the body, and motor driven propellers carried by the body and turned in different directions for causing rotation of the body and wings on the turntable.

3. An airship having a body portion, a base rotatably supporting said body portion, driving motors for causing rotation of the body portion on the base, and rotatable wings operable by air contact only for causing ascent of the airship upon rotation of the body portion.

4. An airship adapted for rotation, a base rotatably supporting the airship, means for rotating the airship on said base, stationary main wings fixed to the airship, and a plurality of sets of boostercopter wings mounted on the main wings and operable by air contact for causing ascent of the airship.

5. An airship adapted for rotation, a base rotatably supporting the airship, means for rotating the airship on said base, stationary main wings fixed to the airship, a plurality of sets of boostercopter wings mounted on the main wings and operable by air contact for causing ascent of the airship, each set of boostercopter wings having a plurality of superposed wings and means for causing rotation of said superposed wings in opposite directions.

FRANK RUSSELL WHITE.